United States Patent [19]

Hanf

[11] Patent Number: 5,404,690
[45] Date of Patent: Apr. 11, 1995

[54] IMPACT BEAM ASSEMBLY METHOD AND APPARATUS

[75] Inventor: Terry K. Hanf, Onsted, Mich.

[73] Assignee: Crescive Die & Tool, Inc., Saline, Mich.

[21] Appl. No.: 37,753

[22] Filed: Mar. 26, 1993

[51] Int. Cl.⁶ ............................................. B60R 27/00
[52] U.S. Cl. ...................... 52/720; 29/897.2; 296/146.6; 296/188; 296/189
[58] Field of Search ...................... 296/146.6, 188, 189, 296/; 49/502; 52/720; 29/897.2, DIG. 41, DIG. 43, 455.1, 505; 228/173.4; 403/270, 271, 272; 297/452.20

[56] References Cited

U.S. PATENT DOCUMENTS

| | | | |
|---|---|---|---|
| 2,827,315 | 3/1958 | Nock et al. | 403/271 |
| 2,903,044 | 9/1959 | Pevas | 297/452.20 |
| 4,090,734 | 5/1978 | Inami et al. | |
| 4,684,166 | 8/1987 | Kanodia | |
| 4,708,390 | 11/1987 | Palentyn et al. | |
| 4,809,999 | 3/1989 | Tozawa et al. | 228/173.4 |
| 4,919,473 | 1/1990 | Laimighofer et al. | 296/188 |
| 4,978,562 | 12/1990 | Wycech | |
| 5,080,427 | 1/1992 | Sturrus et al. | |
| 5,118,159 | 6/1992 | Horling et al. | |
| 5,123,694 | 6/1992 | DePierre et al. | 296/188 |
| 5,232,226 | 8/1993 | Kuroda et al. | 296/188 |

FOREIGN PATENT DOCUMENTS

| | | | |
|---|---|---|---|
| 3500551 | 6/1986 | Germany | 296/188 |
| 0270223 | 11/1988 | Japan | 296/188 |
| 0424118 | 1/1992 | Japan | 296/188 |
| 4260815 | 9/1992 | Japan | 296/189 |

*Primary Examiner*—Carl D. Friedman
*Assistant Examiner*—Christopher Todd Kent
*Attorney, Agent, or Firm*—Reising, Ethington, Barnard, Perry & Milton; James D. Stevens

[57] ABSTRACT

The invention provides an impact beam assembly and method for making the same. The method includes (a) deforming a tubular beam to provide an arcuate channel that extends inwardly from one end of the beam and that has a depth which decreases with increasing distance from the end of the beam, and (b) securing the beam to a mounting fixture near the deformed end of the beam. An arcuate channel and mounting fixture can also be provided at the other end of the impact beam. The arcuate channel provides a tapered profile to the end or ends of the impact beam, while preserving much of the beam's inherent tube strength.

12 Claims, 4 Drawing Sheets

IMPACT BEAM ASSEMBLY METHOD AND APPARATUS

TECHNICAL FIELD

This invention relates generally to impact beam assemblies for automobile and, in particular, to impact door beam assemblies of the type in which the ends of the beam assembly have a narrowed profile which allows the beam assembly to be used in automobile doors that provide only a small clearance for the beam assembly ends.

BACKGROUND OF THE INVENTION

Door impact beams are reinforcing members located within the side doors of automotive vehicles. Their primary purpose is to enhance the impact resistance of the side doors, thereby helping to preserve the general integrity of the automobile in the event of a collision of an object with the broadside of the automobile. The impact beams are located within the door and extend along the length of the door. The ends of the beams are often secured to mounting fixtures which connect the beams to a supporting structure within the door. The beam and its mounting fixtures together constitute the beam assembly.

Impact beams have been made in a variety of cross-sectional shapes, as evidenced by U.S. Pat. No. 4,090,734, issued May 23, 1978 to S. Inami et al., U.S. Pat. No. 4,684,166, issued Aug. 4, 1987 to V. L. Kanodia, and U.S. Pat. No. 4,978,562, issued Dec. 18, 1990 to J. S. Wycech. As shown in the latter of these patents, the impact beam can have a tubular conformation.

In some instances one or both end portions of the impact beam are formed to have a reduced profile. This has been done to provide an appropriately shaped surface to secure the impact beam to the supporting structure within the door. See, for example, U.S. Pat. No. 5,080,427, issued Jan. 24, 1992 to P. Sturrus et al., as well as the aforementioned patent to Wycech. Alternatively, this is sometimes done because the clearance provided within the door for the ends of the impact beam assembly (i.e., the mounting fixtures and end portions of the impact beam) is not enough to accept the full width of the beam. In these instances, the profile of the end portions of the impact beams must be reduced to match the clearance provided.

One way in which the profile of the end portions of the impact beams have been reduced is to remove material, whether by cutting, grinding, or some other means. See, for example, U.S. Pat. No. 4,708,390, issued Nov. 24, 1987 to G. H. Palentyn et al., U.S. Pat. No. 5,118,159, issued Jun. 2, 1992 to T. J. Horling et al., and U.S. Pat. No. 5,123,694, issued Jun. 23, 1992 to R. J. DePierre et al. A second way has been to flatten part or all of the end portion of the impact beam.

One problem associated with reducing the profile of the impact beams at their end portions is that the overall strength and, particularly important, the tensile strength of the impact beam may be reduced. Also, extreme deformation of the end portions can result in cracking of the impact beam under the vibratory conditions to which the impact beam may be exposed, thereby further reducing the strength of the impact beam. Thus, it would be desirable to have an impact beam assembly construction that provides an end portion having a reduced profile with sufficient structural integrity such that the beam assembly remains suitable for its intended purpose.

SUMMARY OF THE INVENTION

In accordance with the present invention there is provided an impact beam assembly apparatus and method for making the same. The method includes the steps of (a) deforming a beam having a tubular conformation to provide an arcuate channel which extends along a portion of the length of the beam from one end thereof and which has a depth that decreases with increasing distance from the end of the beam, and (b) securing the beam to a mounting fixture proximate the end of the beam. The arcuate channel provides a tapered profile to the end portion of the impact beam, while preserving much of the beam's inherent tube strength.

Preferably, the beam comprises a metal tube having a substantially circular cross-sectional shape, except at the end portion where the arcuate channel is formed. The arcuate channel can be formed by stamping the end portion of the tube to form the end portion into first and second opposing walls with the first wall defining the arcuate channel and the second wall remaining substantially unchanged. The end of the beam may be cut through the beam at an oblique angle prior to step (a). Step (a) can then be carried out by stamping the end portion such that the second wall extends beyond the first wall. A recess can be formed in the fixture having a shape suitable for receiving the end portion of the beam. The end portion can then be placed into the recess and welded to the fixture.

In accordance with another aspect of the present invention, an impact beam assembly for an automobile is provided. The assembly comprises a metal tube having first and second ends and a mounting fixture secured to the metal tube at an end portion thereof. The end portion of the tube is defined between the first end and a point intermediate the first and second ends of the tube. The end portion has first and second walls proximate the first end which define a generally U-shaped region therebetween, with the first wall defining an arcuate channel in the outer surface of the end portion and the channel having a depth that is larger at the first end than at the intermediate point.

The impact beam assembly can be configured such that the tube is located about a central axis thereof with the first end defining a plane oriented at an oblique angle with respect to the central axis. The end portion can be secured to the fixture by a pair of welds located along opposite sides of the channel. Additionally, the fixture can include a recess having a shape corresponding to the shape of the second wall with the second wall being disposed in the recess.

In accordance with yet another aspect of the invention, the impact beam assembly can further comprise a second mounting fixture secured to the metal tube at a second end portion thereof. The second end portion of the tube is defined between the second end and a second point intermediate the first and second ends of the tube. The second end portion has third and fourth walls proximate the second end which define a generally U-shaped region therebetween, with the third wall defining a second arcuate channel in the outer surface of the second end portion and the second channel having a depth that is larger at the second end than at the second intermediate point.

The method and apparatus of the present invention advantageously provide an impact beam assembly having a reduced profile at its ends, while retaining much of the inherent strength of the impact beam. The arcuate channel formed in the end portions of the impact beam provides the end portion with a tapered profile which can be selected as desired for a particular vehicle door. The channel can be formed by known metal stamping techniques, thereby making the impact beam inexpensive to manufacture.

BRIEF DESCRIPTION OF THE DRAWINGS

The preferred exemplary embodiments of the present invention will hereinafter be described in conjunction with the appended drawings, wherein like designations denote like elements, and.

DESCRIPTION OF THE PREFERRED EMBODIMENTS

Figure 1:
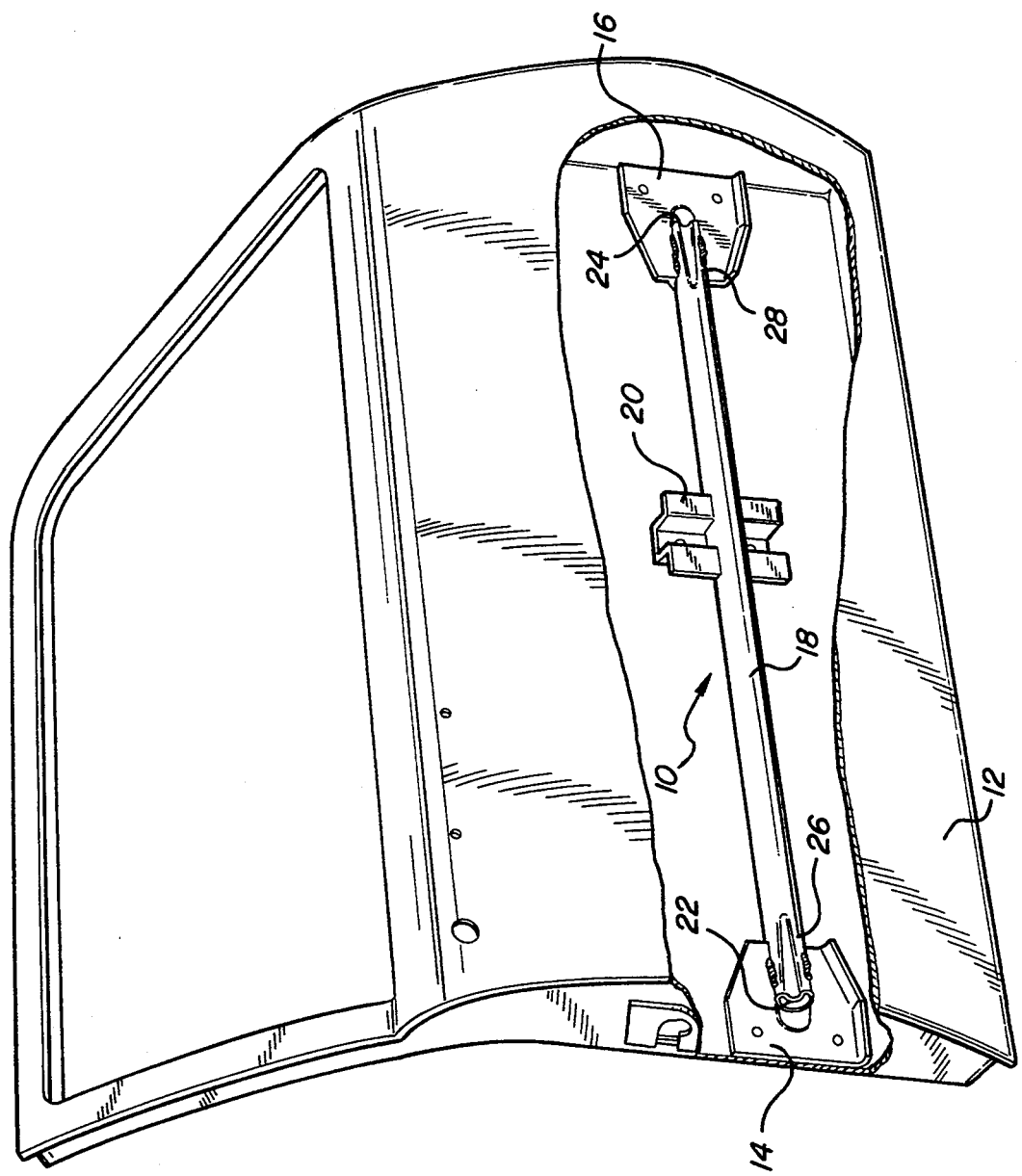
FIG. 1 is a side view of an automobile door with a portion of the door cut away to show an impact beam assembly of the invention mounted within the door.

As shown in FIG. 1, an impact beam assembly of the present invention, designated generally as 10, is mounted within an automobile side door 12. Beam assembly 10 includes a pair of mounting fixtures or brackets 14, 16 and a metal beam or tube 18, each end of which is secured to one of the mounting fixtures 14, 16. A center support 20 attached to door 12 fixes the position of tube 18 at its midsection. Beam assembly 10 extends along the length of door 12 and is attached to opposite ends of door 12 via mounting fixtures 14, 16.

Tube 18 is a straight, elongated metal tube that has a pair of ends 22, 24. Ends 22, 24 define one margin of a pair of end portions 26, 28, respectively. Tube 18 preferably has a circular cross-sectional shape, except at its end portions 26, 28. To simplify the description and understanding of the present invention, only the details of construction of end portion 26 and mounting fixture 14 will hereinafter be described. Of course, such details are meant to apply equally to the other end of impact beam assembly 10 (i.e., end portion 28 and mounting fixture 16). As explained below in greater detail, end portion 26 extends a short distance from end 22 toward the midsection of tube 18 and has a cross-sectional shape that varies between a generally U-shaped conformation at end 22 and a circular conformation at the other margin of end portion 26.

Referring now to FIGS. 2 through 5, a method of forming beam assembly 10 will hereinafter be described. FIG. 2A depicts end portion 26 of tube 18 prior to being deformed. As FIG. 2A indicates, end portion 26 initially has the same circular cross-sectional shape as the remainder of tube 18. End 22 generally lies within a plane that is perpendicular to the central axis 30 of tube 18. As shown in FIG. 2B, end portion 26 is then deformed, such as by stamping, to form an arcuate channel 32 which extends from end 22 toward the midsection of tube 18. The depth of channel 32 decreases with increasing distance from end 22. That is, channel 32 is deeper at the margin of end portion 26 defined by end 22 than it is at the other margin of end portion 26 where the depth of channel 32 decreases to zero.

In particular, end portion 26 is deformed to provide first and second opposing walls 34 and 36, respectively. Wall 34 comprises the upper part of end portion 26 defined between a pair of opposed lengthwise boundaries 38, 40. Conversely, wall 36 comprises the lower part of end portion 26 defined by boundaries 38, 40. As walls 34 and 36 together comprise a unitary structure, it will of course be understood that boundaries 38, 40 are imaginary lines established only for the purpose of describing the conformation of end portion 26. Deformation of end portion 26 is preferably done such that the part of end portion 26 that becomes wall 36 is substantially unchanged by the deforming operation. Wall 34, however, is substantially deformed in the direction of wall 36. The deformation is greatest near end 22, where walls 34 and 36 define a generally U-shaped region. The deformation gradually decreases from end 22 in a direction toward the other margin of end portion 26 at which point the region defined between walls 34 and 36 becomes circular. As will now be apparent, the outer surface of wall 34 defines arcuate channel 32.

This above-described deformation of end portion 26 provides it with a tapered profile suitable for use on vehicle doors where the clearance provided for end portion 26 is less than the outer diameter of tube 18 in its initial, undeformed state. Additionally, for any one tube, this deformation is believed to result in a greater amount of the inherent tubing strength being retained than would be retained if the same profile were to be formed by cutting or grinding away material from the tube. Consequently, impact beam assembly 10 can be made using a tube that has a relatively small wall thickness, thereby enabling reduction of the overall weight of impact beam assembly 10 and, therefore, the vehicle to which it is mounted.

Figure 2A:
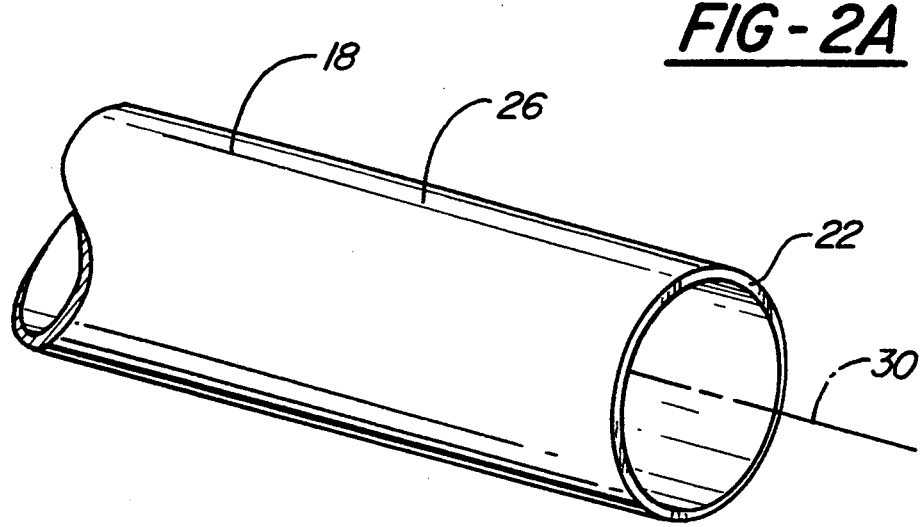
FIG. 2A is a perspective view of an end portion of an impact beam suitable for use in the present invention.
Figure 2B:
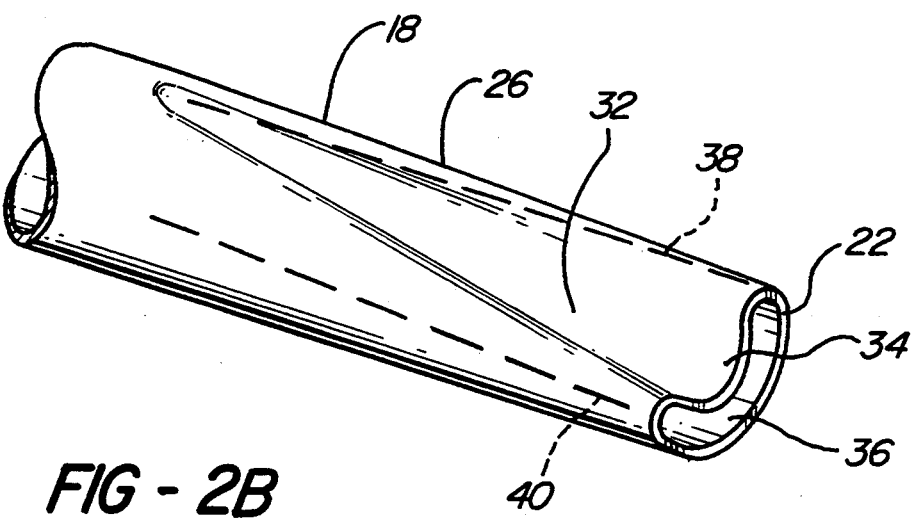
FIG. 2B is a perspective view of the end portion of FIG. 2A after having an arcuate channel formed therein.
Figure 3A:
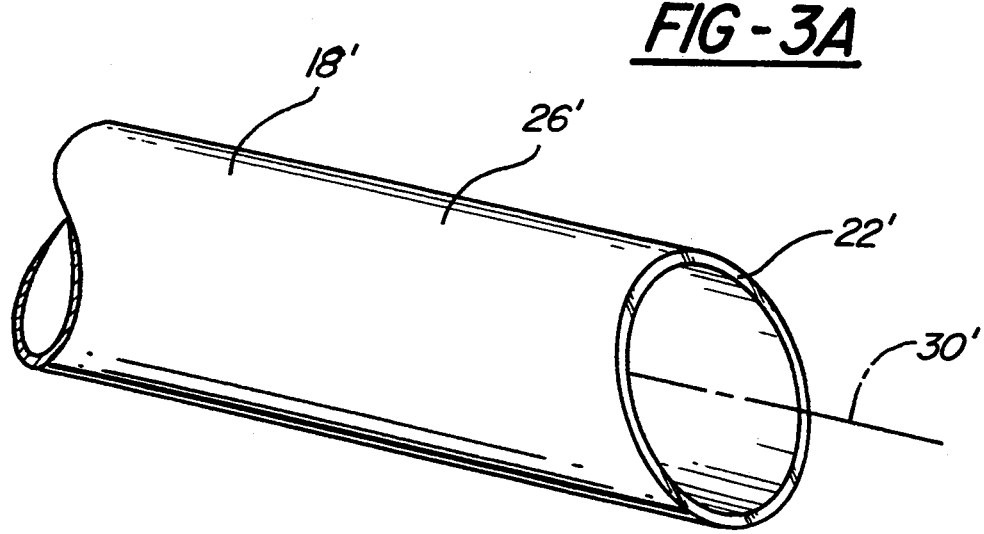
FIG. 3A is a perspective view of an end portion of a second impact beam suitable for use in the present invention, the end of the beam lying at an oblique angle with respect to the central axis thereof.
Figure 3B:
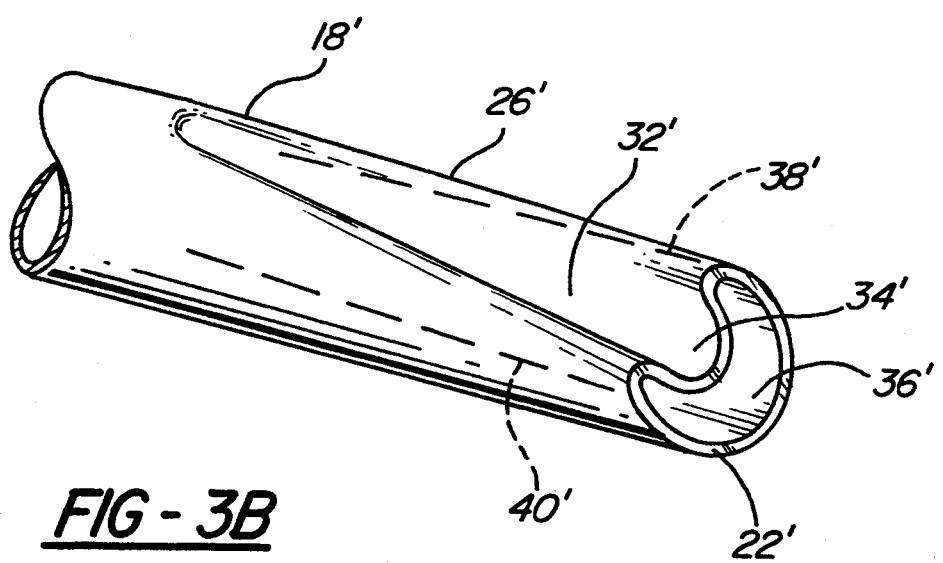
FIG. 3B is a perspective view of the end portion of FIG. 3A after having an arcuate channel formed therein.

FIGS. 3A and 3B depict an alternative tube 18' which is similar to tube 18 of FIGS. 2A and 2B, except that end 22' generally lies within a plane that is at an oblique angle with respect to central axis 30'. As shown in FIG. 3B, end portion 26' is deformed such that wall 36' extends substantially beyond wall 34' in the lengthwise direction. The remaining characteristics of end portion 26' are the same as that of end portion 26 of FIGS. 2A and 2B.

Figure 4:
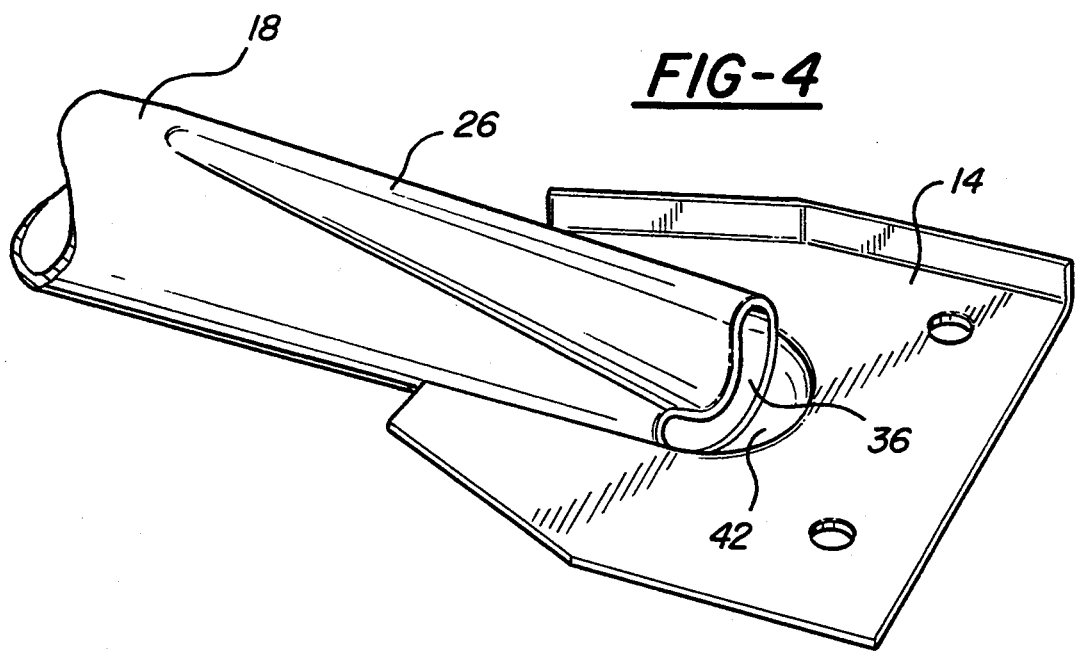
FIG. 4 is a perspective view showing the end portion of FIG. 2B located within a recess formed in a mounting fixture constructed in accordance with the invention.
Figure 5:
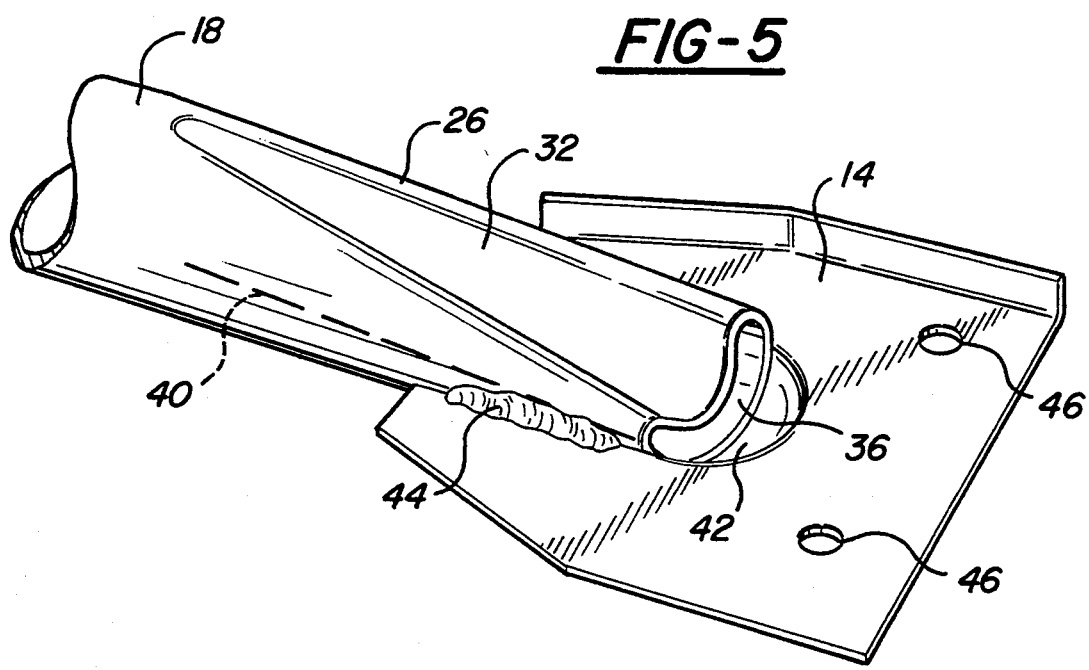
FIG. 5 is a perspective view of one end of an impact beam assembly of the invention showing the end portion and mounting fixture of FIG. 4 welded together along the arcuate channel formed in the end portion of the impact beam.

Once end portion 26 is formed, it is secured to mounting fixture 14, as shown in FIGS. 4 and 5. Although mounting fixture 14 can be constructed to have any conformation suitable for a particular application, a recess 42 is preferably formed therein which has a shape that corresponds to the outer surface of wall 36 of tube 18 (e.g., semicircular). End portion 26 can then be placed within recess 42, as shown in FIG. 4. Referring next to FIG. 5, end portion 26 is then secured to mounting fixture 14 by a pair of welds 44 (only one shown) that extend generally along boundaries 38, 40 (i.e., along opposite sides of channel 32). The number, size, and placement of welds can be selected as appropriate for a particular tube and mounting fixture. Moreover, other suitable means of securing tube 18 to mounting fixture 14 can be used. Mounting fixture 14 can be formed with one or more clearance holes 46 for attaching impact beam assembly 10 to the automobile side door, it being understood that the particular means to attach impact beam assembly 10 to the automobile side door is not at all pertinent to the present invention.

Tube 18 can be an electric resistance welded tube of fine-grained, high-strength, fully-killed martensitic carbon steel. Preferably, the steel has a chemical composition which includes 0.18–0.20 percent carbon, 0.20–0.60 percent manganese, a maximum of 0.020 percent phosphorous, and a maximum of 0.025 percent sulfur. This chemical composition provides a tube that has a design tensile strength of at least 190,000 Psi (MPa), a yield strength minimum of 176,000 Psi (MPa), and an elongation rating of not more than 5–6.5 percent. The resulting tubing surface hardness value is typically 40 to 50 as measured on a Rockwell C scale. Tube 18 can also contain other elements in amounts of less than one percent for the purpose of enhancing various mechanical or physical properties. Mounting fixtures 14, 16 are preferably made of steel, generally described as type 1008 to 1010, hot-rolled, rolled, aluminum-killed and of drawing (stamping) quality. The wall thickness of tube 18 and mounting fixtures 14, 16 may vary according to the specific sites of use, mechanical and safety considerations related thereto, and other user specifications, as will be appreciated by those skilled in the art.

It will thus be apparent that there has been provided in accordance with the present invention an impact beam assembly method and apparatus which achieves the aims and advantages specified herein. It will of course be understood that the foregoing description is of preferred exemplary embodiments of the invention and that the invention is not limited to the specific embodiments shown. Various changes and modifications will become apparent to those skilled in the art and all such variations and modifications are intended to come within the spirit and scope of the appended claims.

I claim:

1. A method of making an impact beam assembly for an automobile door, comprising the steps of:
   (a) deforming a tubular beam having a substantially uniform cross-sectional shape in a single stamping operation by compressing a section of an end portion of said tubular beam inwardly to provide an arcuate channel which extends along a portion of the length of said beam from one end thereof and which has a depth that decreases with increasing distance from said end of said beam, and
   (b) providing a mounting fixture having a recess shaped to receive said end portion,
   (c) disposing said end portion into said recess, and
   (d) securing said end portion to said mounting fixture.

2. The method of claim 1, wherein said beam comprises a metal tube that, prior to step (a), has a substantially circular cross-sectional shape.

3. The method of claim 2, wherein step (a) further comprises stamping said end portion of said tube to form said end portion into first and second opposing walls with said first wall defining said arcuate channel and said second wall remaining substantially unchanged.

4. The method of claim 3, further comprising the step of forming said end of said beam by cutting through said beam at an oblique angle prior to step (a), wherein step (a) further stamping said end portion such that said second wall extends beyond said first wall.

5. The method of claim 1, wherein step (d) further comprises welding said beam to said fixture.

6. An impact beam assembly for an automobile, comprising:
   a metal tube having first and second ends and an end portion defined between said first end and a point intermediate said first and second ends, said end portion having first and second walls proximate said first end which define a generally U-shaped region therebetween, said first wall defining an arcuate channel in the outer surface of said end portion, said channel having a depth that is larger at said first end than at said intermediate point, and
   a mounting fixture secured to said end portion at a plurality of locations about the circumference of said end portion;
   wherein the circumferential distance about said tube at said first end is the same as the circumferential distance about said tube at said intermediate point.

7. An impact beam assembly as defined in claim 6, wherein said tube is located about a central axis thereof and wherein said first end defines a plane oriented at an oblique angle with respect to said central axis.

8. An impact beam assembly as defined in claim 6, further comprising a pair of welds securing said end portion to said fixture along opposite sides of said channel.

9. An impact beam assembly as defined in claim 6, wherein said fixture includes a recess having a shape corresponding to the shape of said second wall and wherein said second wall is disposed in said recess.

10. An impact beam assembly as defined in claim 6, further comprising:
    a second end portion defined between said second end and a second point intermediate said first-mentioned intermediate point and said second end, said second end portion having third and fourth walls proximate said second end which define a generally U-shaped region therebetween, said third wall defining a second arcuate channel in the outer surface of said second end portion, said second channel having a depth that is larger at said second end than at said second intermediate point,
    a second mounting fixture secured to said second end portion.

11. A reinforced door frame for an automobile, comprising:
    an automobile door frame:
    a metal tube extending along the length of said door frame and having first and second ends and an end portion defined between said first end and a point intermediate said first and second ends, said end portion having first and second walls proximate said first end which define a generally U-shaped region therebetween, said first wall defining an arcuate channel in the outer surface of said end portion, said channel having a depth that is larger at said first end than at said intermediate point;
    wherein said walls meet as a unitary structure along a pair of common boundary lines that extend lengthwise along said end portion of said tube from said first end;

wherein said first and second walls each have inner surfaces extending between said boundary lines, each portion of each one of said inner surfaces being spaced out of contact from all other portions of said one surface and from said other inner surface; and wherein said metal tube is rigidly connected to said door frame at said end portion and at said second end.

12. A reinforced door frame as defined in claim 11, further comprising a pair of mounting fixtures, wherein said metal tube is rigidly connected to said door frame at each of said ends by one of said mounting fixtures.

* * * * *